United States Patent
Addy et al.

(10) Patent No.: US 9,418,664 B2
(45) Date of Patent: *Aug. 16, 2016

(54) SYSTEM AND METHOD OF SPEAKER RECOGNITION

(71) Applicant: HONEYWELL INTERNATIONAL INC., Morristown, NJ (US)

(72) Inventors: Kenneth L Addy, Massapequa, NY (US); Ronald K. Rothman, Smithtown, NY (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/603,495

(22) Filed: Jan. 23, 2015

(65) Prior Publication Data

US 2015/0142439 A1 May 21, 2015

Related U.S. Application Data

(63) Continuation of application No. 13/710,128, filed on Dec. 10, 2012, now Pat. No. 8,971,854.

(60) Provisional application No. 61/661,424, filed on Jun. 19, 2012.

(51) Int. Cl.
*H04M 1/66* (2006.01)
*H04M 3/00* (2006.01)
*G10L 17/22* (2013.01)
*H04W 12/06* (2009.01)
*G10L 17/00* (2013.01)
*G10L 15/22* (2006.01)

(52) U.S. Cl.
CPC ............... *G10L 17/22* (2013.01); *G10L 17/00* (2013.01); *H04W 12/06* (2013.01); *G10L 15/22* (2013.01)

(58) Field of Classification Search
None
See application file for complete search history.

(56) References Cited

U.S. PATENT DOCUMENTS

| 7,158,776 | B1 | 1/2007 | Estes et al. |
| 7,853,243 | B2 | 12/2010 | Hodge |
| 8,971,854 | B2 * | 3/2015 | Addy et al. ............... 455/411 |
| 2005/0096906 | A1 | 5/2005 | Barzilay |
| 2005/0275505 | A1 | 12/2005 | Himmelstein |
| 2009/0190735 | A1 * | 7/2009 | Gilmartin et al. ........ 379/201.12 |
| 2010/0097178 | A1 | 4/2010 | Pisz et al. |
| 2010/0194571 | A1 * | 8/2010 | Ortiz et al. ............... 340/572.1 |

* cited by examiner

*Primary Examiner* — Erika A Washington
(74) *Attorney, Agent, or Firm* — Husch Blackwell LLP

(57) ABSTRACT

An authentication and authorization apparatus combines a unique identifier for a communications device with pre-stored voice recognition information. Incoming audio, associated with the unique identifier, is processed to authenticate the speaker. In response to successful authentication, a requested function or action embedded in the audio can be recognized and, if authorized, implemented by a displaced system.

15 Claims, 3 Drawing Sheets

When operating a local system, the unique identifier provided by the near field communication (NFC) chip within the smart phone may be used to identify the voice of the phone owner so that the local recognition algorithm can simply match the voice to the proper credentials (Fig 2)

In a residential home security system a phone that is NFC enabled arms or disarms a security system. In this case the system then prompts for a voice command which is enacted only-if the NFC and voice are a matched-pair

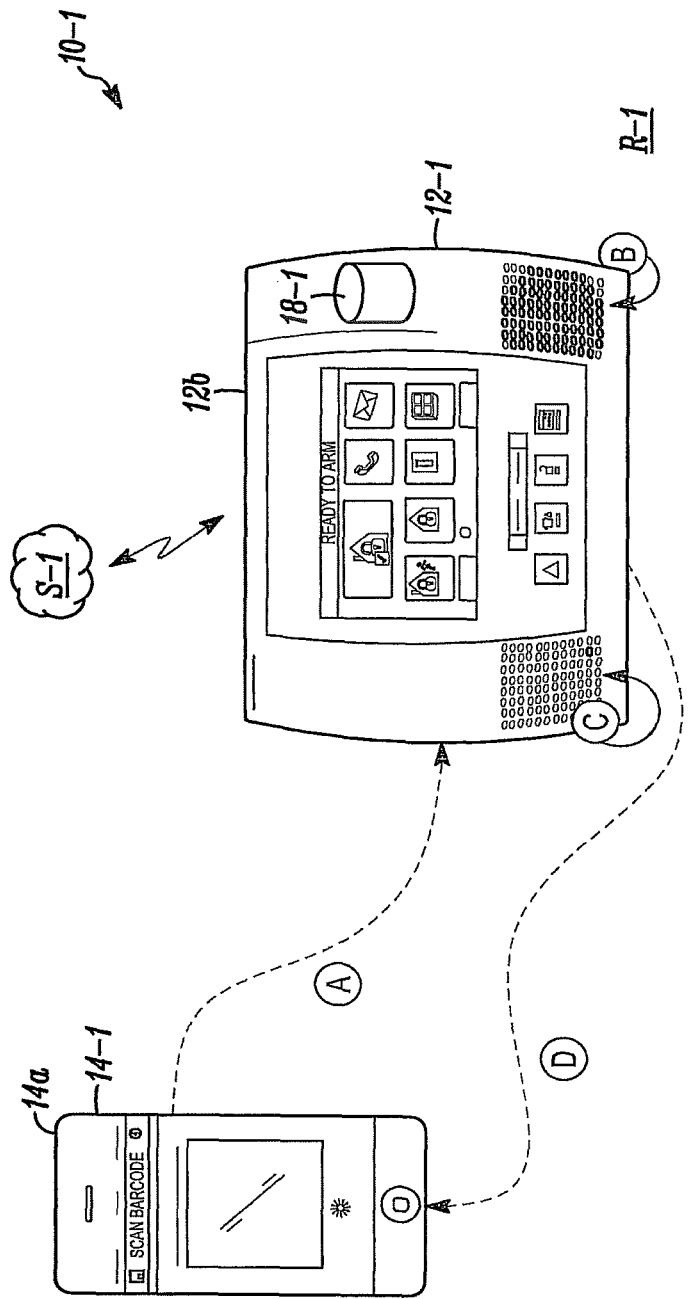

When operating a local system, the unique identifier provided by the near field communication (NFC) chip within the smart phone may be used to identify the voice of the phone owner so that the local recognition algorithm can simply match the voice to the proper credentials (Fig 2)

In a residential home security system a phone that is NFC enabled arms or disarms a security system. In this case the system then prompts for a voice command which is enacted only-if the NFC and voice are a matched-pair

FIG. 2

SYSTEM AND METHOD OF SPEAKER RECOGNITION

CROSS-REFERENCE TO RELATED APPLICATION

This application is a continuation of co-pending U.S. application Ser. No. 13/710,128, filed on Dec. 10, 2012, now U.S. Pat. No. 8,971,854, entitled "System and Method of Speaker Recognition", which is incorporated herein by reference. This application also claims the benefit of the filing date of U.S. Provisional Application Ser. No. 61/661,424 filed Jun. 19, 2012, entitled "Voice Commanded Mobile Security Controller" (the "'424 application"). The '424 application is incorporated herein by reference.

FIELD

The application pertains to systems and methods for providing secure voice control of wireless communications devices. More particularly, the application pertains to such systems and methods which provide authentication of a speaker using multiple identifying indicia.

BACKGROUND

There is increasing use of applications or "apps" in mobile devices, e.g. tablet computers, smart phones and personal digital assistant (PDA's), to control various building and home automation systems over local area and wide area networks. In addition, there are applications that run on these mobile devices which recognize human speech and perform some task on the device itself or at a central location. In order to improve the human-machine-interface in an automation system, a speech recognition application running on a mobile device, which converts speech into digital form and then to other communication protocols suitable for transport on a LAN/WAN, provides a reliable, hands-free, convenient method of use. The '424 application, incorporated herein by reference, discloses one such system.

While useful, speech recognition systems can exhibit limitations from a security point of view since speech, not "voice", is being recognized. Speech recognition is much simpler to perform than individual voice recognition. The recognition process, however, does not necessarily provide a desired level of authentication. Speech recognition is not necessarily tied to an individual. Hence, it would be useful to authenticate the user or speaker in such systems.

BRIEF DESCRIPTION OF THE DRAWINGS

FIG. 2 illustrates a diagram of another system in accordance herewith; and

DETAILED DESCRIPTION

Figure 1:
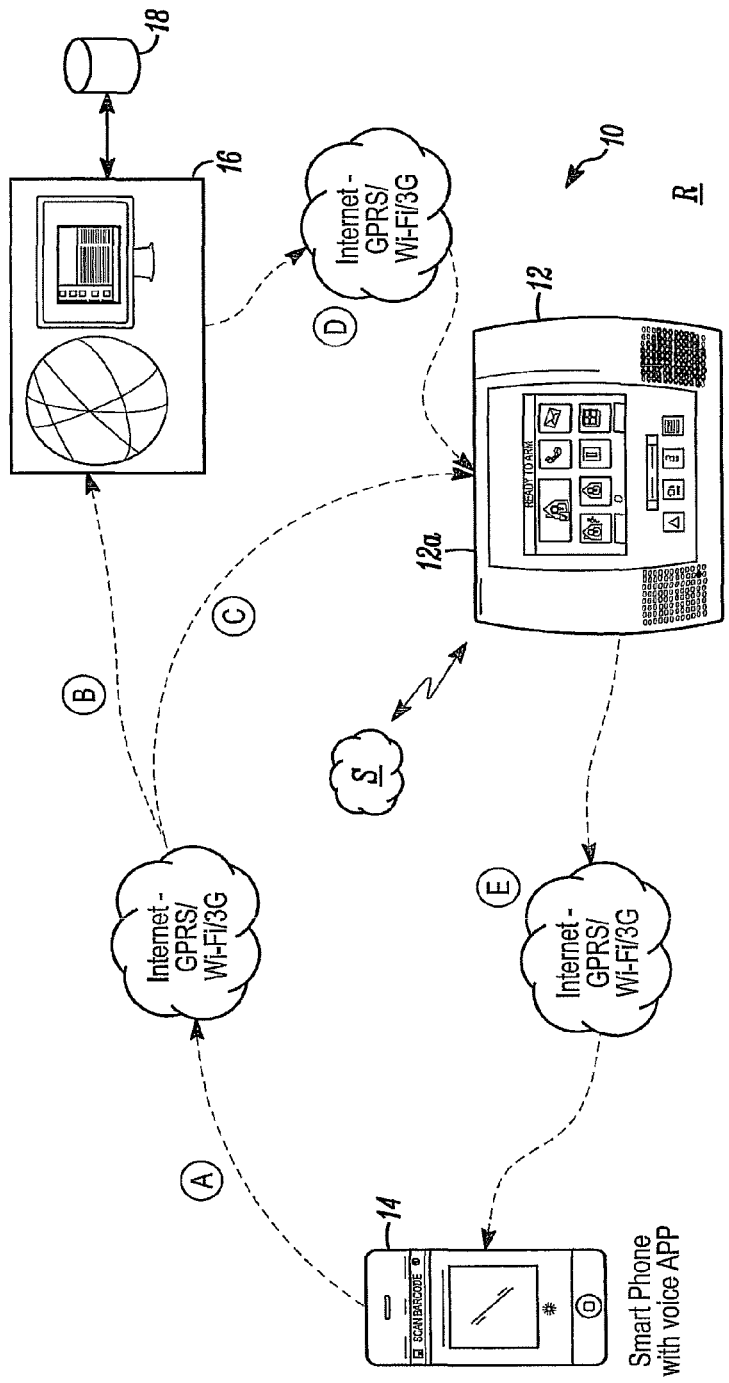
FIG. 1 illustrates a diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same, and is not intended to limit the application or claims to the specific embodiment illustrated.

In one aspect, authentication can be implemented prior to speech recognition to provide an increased level of security. In this regard, and to reduce the complexity of voice recognition, it is preferred to target a particular speaker's voice rather than search an extensive database having information associated with a plurality of speakers to find a particular voice.

Advantageously, the particular speaker can be associated with a particular, wireless communication device, for example, using a unique smart-phone ID, to reduce the complexity of the voice recognition, authentication, process. Another benefit of linking a particular voice and particular device is that certain specific profiles and activities can be authorized subsequent to authentication. For example, a message from a home-owner's phone might produce a different result than a message from a child's or a nanny's mobile phone.

When authenticating a speaker by carrying out a voice recognition activity via a central remote computing station, the wireless device identifier, such as the mobile equipment identifier (MEID), mobile identification number (MIN), or international mobile equipment identifier (IMEI), provides additional originating information so that the voice recognition algorithm can target a specific user. As a result, faster, more reliable, and more secure processing can be provided. Additionally authorization can be provided relative to profiles available to a phone/user.

In one aspect, a previously downloaded application being executed on the smart phone digitizes the speech of the individual and sends the information with the mobile device's globally unique identifier to a central computing location. The unique phone ID can be used to identify a particular individual. The authentication process, the voice recognition processing, can use the phone ID as a vector or index into a voice recognition data base which can provide reliable, quicker and secure results.

In another aspect, the wireless communications device can include authentication information for the expected user of that device. In this embodiment, the authentication, and authorization, processing can take place locally at the device, for example, on a smart phone. Then, the requesting message or command can be transmitted.

The application being executed can include a learning phase to improve security by storing certain phrases from certain speakers and storing the voice patterns with the phone identifier, for example an IMEI.

In one embodiment, an application executing on a mobile phone could transmit a command in the form of digitized speech to a displaced computing facility which, after authentication, would then recognize the command or word, for example, "disarm", from a certain user. The facility could then send the necessary digital data over a network to disarm a specific security system, enable specific lighting scenes, unlock certain doors, etc. A small business owner might say "disarm home" to control her home system, or "arm work" to address a change in her business' system.

In an embodiment of a local system, a unique identifier provided by a near field communication (NFC) chip in a smart phone could be used to identify the speaker. Locally stored authentication software can process the incoming audio from the speaker. Once the authentication process has been successfully concluded, and speech recognition carried out, the subsequently recognized command or request can be transmitted to a security system, or any other type of system, for execution.

Figure 3:
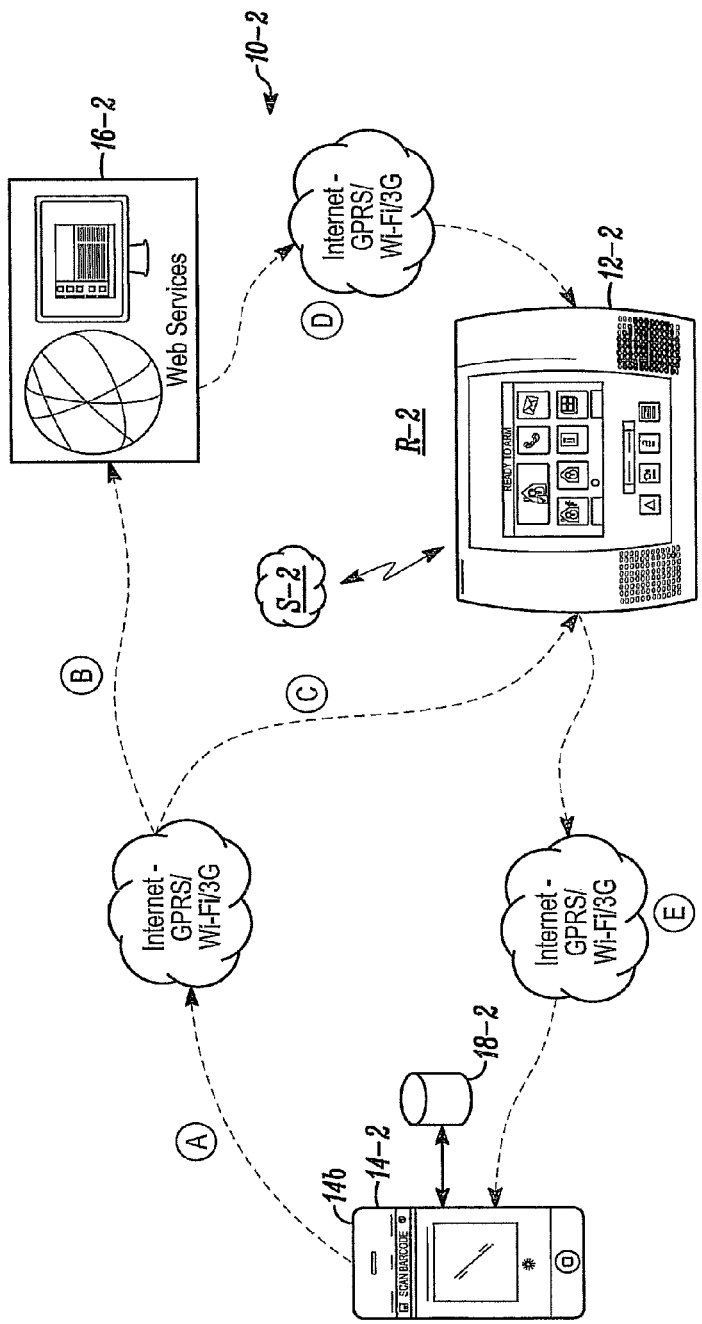
FIG. 3 illustrates a diagram of yet another system in accordance herewith.

FIGS. 1-3 illustrate different embodiments hereof. Other embodiments come within the spirit and scope hereof.

FIG. 1 illustrates a combination 10 which can include a security monitoring system 12. System 12 is installed so as to monitor conditions in a region R. As those of skill in the art will understand, potential conditions include sensing intrusion, temperature, smoke, gas or fire all without limitation. System 12 can include a display and keyboard for local control as illustrated.

An exemplary wireless communications device, such as a smart phone 14, can include a previously downloaded application. The application facilitates authentication and authorization. A user of the phone 14 can verbally speak a command or request into the phone 14.

The incoming audio message is digitized and transmitted, using the application executing on the phone 14, along with a phone identifier (ID), via a wireless medium, to a displaced computing facility 16. The facility 16 could include a programmable processor, along with executable control software, to receive and process the digitized voice stream and ID from the phone 14. The facility 16 also includes a voice authentication, recognition, data base 18.

Data base 18 can include voice recognition information for a plurality of individuals. The recognition information for each individual is linked to an individual specific identifier associated with a communications device such as a smart phone, personal digital assistant, computer, tablet or the like, without limitation. For example, the identifier of the phone 14 can be stored in the data base 18 linked to information as to the listed operator of the phone 14. The phone identifier can be used as an index or vector to obtain the pre-stored voice based authentication information from the data base 18 for the specific person associated with the device 14.

The facility 16 can then implement an authentication process with respect to the received, digitized voice sample from phone 14. If the voice is authenticated, then the facility 16 can recognize the command or request in the speech stream from the user.

The function, command, or other request can then be directed back to system 12 for implementation. For example, system 12 can be disarmed, specific lighting scenes can be enabled, doors can be locked or unlocked, or the status of areas in the region 12 or environmental conditions can be requested by the facility 16 from system 12, all without limitation. Confirmation can be subsequently provided to the phone 14 by the system 12.

In accordance with a method as illustrated in FIG. 1, the digitized voice stream and phone ID are transmitted via a WAN, link A, to the facility 16, link B. Some or all of that data can also be transmitted to system 12, link C.

The incoming digitized audio from the phone 14 is processed, as described above, in the facility 16, using the data base 18. If the voice is authenticated and is then authorized, the resultant directive, function, or request is forwarded to the system 12 for execution via a WAN, link D. Once system 12 has implemented the order, request, or the like, a confirmatory message is forwarded to the phone 14 and the user via a WAN, link E.

Advantageously, in the combination 10, security is enhanced and over-all processing time can be reduced since the facility 16, upon receipt of the data stream from the phone 14, can determine whether the ID of the phone 14 and the associated data stream match the pre-stored voice of the listed operator of the phone 14 without having to retrieve and process extensive quantities of voice information for a large number of individuals from the data base 18.

FIG. 2 illustrates a local combination 10-1 where a security system 12-1 is monitoring conditions in a region R-1. In 10-1, authentication and authorization can be performed locally in system 12-1 in response to a stream of digitized audio from a smart phone 14-1, or other wireless device. In 10-1, a unique identifier provided by the near field communication chip within the smart phone 14-1 can be used to identify the voice of the authorized user of the phone 14-1. An authentication process can be executed by system 12-1 to compare the incoming digitized audio with pre-stored voice associated with the near field ID associated with the smart phone 14-1. Where the voice from the phone 14-1 has been authenticated, it can be recognized and the requested command, or request, can be implemented at system 12-1.

In accordance with a method as illustrated in FIG. 2, the smart phone 14-1 can be moved or swiped into the field of the communications controller for the system 12-1, link A. The system, in response, can request a password, as at speaker B. The user can respond as at microphone C. The system 12-1 can process the voice message from the user, via the phone 14-1. If the incoming digitized audio matches the pre-stored voice data in the system 12-1 that is associated with the near field ID for the phone 14-1, then the requested process, command, or inquiry will be implemented via the system 12-1. System 12-1 can confirm to the phone 14-1 the status of the implemented process, command, or inquiry.

Advantageously, in the combination 10-1, security is enhanced and over-all processing time can be reduced since the system 12-1, upon receipt of the data stream from the phone 14-1, can determine whether the ID of the phone 14-1 and the associated data stream match the pre-stored voice of the listed operator of the phone 14-1 without having to retrieve and process extensive quantities of voice information for a large number of individuals which might be stored in system 12-1.

FIG. 3 illustrates a combination 10-2 which can include a security monitoring system 12-2. System 12-2 is installed so as to monitor conditions in a region R-2. System 12-2 can include a display and keyboard for local control as illustrated.

An exemplary wireless communications device, such as a smart phone 14-2, can include a previously downloaded application. The application facilitates authentication and authorization.

A user of the phone 14-2 can verbally speak a command or request into the phone 14-2. The application executed on the phone 14-2 carries out an authentication function, relative to the incoming audio from the user. The received audio, when authenticated, can also be processed in the phone 14-2 to recognize which command or request has been spoken.

In one embodiment, where the incoming audio corresponds to the pre-stored voice of the authorized user, or owner, the voice stream and mobile phone ID can be transmitted via a WAN, links A, B, to the displaced computing facility 16-2. Data can also be transmitted from the phone 14-2, via link C, to the system 12-2.

The facility 16-2 can process the digitized incoming audio, and if needed, carry out a speech recognition function. The request, action, or command can be transmitted from the facility 16-2, via link D, to system 12-2 for implementation. When the system 12-2 has carried out the requested function, results can be returned to the phone 14-2 via link E.

Alternately, the NFC chip of the phone 14-2 can be enabled so that the phone 14-2 and the system 12-2 can communicate directly. The system 12-2 can then implement the order or request.

Advantageously, in the combination 10-2, security is enhanced and over-all processing time can be reduced since the phone 14-2 can directly determine whether the incoming audio matches the pre-stored voice of the listed operator of the phone 14-2 without having to retrieve and process extensive quantities of voice information for a large number of individuals.

From the foregoing, it will be observed that numerous variations and modifications may be effected without departing from the spirit and scope hereof. It is to be understood that no limitation with respect to the specific apparatus illustrated herein is intended or should be inferred.

It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. A method comprising:
   a security system sensing a device identifier for a wireless communication device;
   the security system receiving a digitized stream of incoming audio from the wireless communication device;
   the security system requesting and receiving verbal password audio received by a microphone at the security system;
   the security system selecting pre-stored voice related information associated with the device identifier;
   the security system carrying out an authentication process by comparing the received verbal password audio to the selected pre-stored voice related information; and
   the security system responding to authenticating the received verbal password audio by recognizing the incoming audio and implementing a function associated with the recognized incoming audio.

2. A method as in claim 1 which further comprising sensing signals using a near field communications reader.

3. A method as in claim 1 wherein the device identifier comprises one of a smart phone identifier, or a unique identifier of the wireless communication device.

4. A method as in claim 1 further comprising generating an output indicating that the verbal password audio has been authenticated.

5. A method as in claim 1 wherein, responsive to the recognized incoming audio, a command or request is transmitted to a remote location for implementation.

6. A method as in claim 1 further comprising providing a pre-stored database which contains voice recognition information for a plurality of individuals.

7. A method as in claim 6 further comprising receiving exemplary voice information, and identification information, and storing the exemplary voice information and the identification information in the pre-stored database for subsequent retrieval.

8. A speech authentication and authorization combination comprising:
   circuitry to associate a device identifier for a communications device with pre-stored voice recognition information for an authorized user of the communications device;
   circuitry to receive a stream of incoming audio from the communications device requesting that a function be implemented in a security system control panel;
   microphone circuitry to receive verbal password audio at the security system control panel;
   circuitry to carry out an authentication process by determining if at least part of the verbal password audio corresponds to the pre-stored voice recognition information associated with the device identifier;
   circuitry to respond to results of the authentication process by implementing a speech recognition process relative to at least a portion of the stream of incoming audio; and
   circuitry to implement the requested function.

9. A combination as in claim 8 further comprising circuitry, responsive to the speech recognition process, to generate a function designating output.

10. A combination as in claim 9 further comprising circuitry to transmit the function designating output to the security system control panel for implementation.

11. An apparatus as in claim 8 wherein the circuitry to associate includes a pre-stored data base of voice recognition information and associated communication device identification information.

12. An apparatus as in claim 8 further comprising the communications device, wherein the communications device includes a transmittable unique identifier, and wherein the circuitry to associate is located at one of, the communications device, and a displaced computer.

13. An apparatus as in claim 12 wherein the circuitry to carry out the authentication process is located at the displaced computer.

14. A method comprising:
    providing a communication device having a device identifier;
    establishing a data base having identification indicia linked to voice recognition information for each member of a plurality of persons;
    receiving a stream of audio from the communication device;
    receiving verbal password audio from a microphone associated with a security control panel;
    associating the device identifier with the verbal password audio;
    forwarding the device identifier and a representation of the verbal password audio to the data base;
    retrieving selected voice recognition information from the data base, using the device identifier;
    carrying out voice recognition processing between the retrieved voice recognition information, and the representation of the verbal password audio;
    responsive to results of the voice recognition processing, determining if the retrieved voice recognition information and the representation of the verbal password audio correspond to a same person; and
    carrying out speech recognition processing of a representation of the stream of audio.

15. A method as in claim 14 which further comprising issuing a request or instruction associated with the stream of audio to a displaced apparatus for implementation.

* * * * *